May 3, 1966 E. J. HERBENAR 3,249,375
BALL JOINT
Filed June 25, 1962 2 Sheets-Sheet 1

INVENTOR.
Edward J. Herbenar
BY
ATTORNEYS

May 3, 1966  E. J. HERBENAR  3,249,375
BALL JOINT

Filed June 25, 1962  2 Sheets-Sheet 2

INVENTOR.
Edward J. Herbenar
BY
ATTORNEYS

United States Patent Office 3,249,375
Patented May 3, 1966

3,249,375
BALL JOINT
Edward J. Herbenar, Detroit, Mich., assignor to
TRW Inc., a corporation of Ohio
Filed June 25, 1962, Ser. No. 204,726
3 Claims. (Cl. 287—90)

The present invention relates to ball and socket type joint structures and is, more particularly, concerned with the provision of an inexpensive ball and socket construction having a very side tolerance stability.

As those skilled in the art of manufacturing automotive ball joint constructions are aware, the prior art is replete with examples of ball and socket joints intended to carry automotive steering loads and the like. Major advances in recent years concerning such joints have dealt with improved life and, where possible, with reduction in costs without simultaneous reduction in life, safety or function. In recent years joints of the type termed "greased-for-life" have conventionally incorporated a resilient bearing seat constructed of self-lubricating plastic such as nylon or Teflon or standard polyethylene. These surfaces, particularly when initially coated with lubricant, have provided an assembled joint capable of withstanding ordinary automotive usage for many thousands of miles. However, in the manufacture of such joints it has been found extremely difficult to provide truly accurate assembly capable of achieving any real measure of consistency of the turning effort required to move the joint parts relative to each other. In accordance with the present invention, an improved ball and socket joint is provided in which the turning torque required to move the ball joint stud relative to its housing is readily controlled during assembly of the joint in an inexpensive manner.

In accordance with the present invention, a substantially improved and simplified joint is constructed employing so called "linear" or "high density" polyethylene as the ball joint bearing material. This bearing material is shaped in a manner providing an initial preload on the bearing in the assembled condition. The preload is variable within a relatively wide range without seriously affecting the turning torque level of the joint, and, as a result, manufacturing and production tolerances of a much wider range than those heretofore employable may be used. The relatively wide range of tolerances permits an extremely inexpensive joint to be manufactured since, as those skilled in manufacturing technique are aware, one of the most important factors in the reduction of cost in mass produced items is the elimination of critical tolerances. This has been achieved in accordance with the present invention without impairing the efficiency of the resulting joint and, in fact, a particularly efficient ball joint is provided.

More specifically, in accordance with the present invention, high density polyethylene is formed in a tubular shape. This tube is provided with a slight axial flare and an internal segmental spherical portion between the ends thereof. In constructing the joint, the ball of the ball stud is snapped into the segmental spherical recess, an operation which is possible as a result of the slight yieldability of the high density polyethylene. The assembled ball stud and flaring tubular section of plastic is then forced into a substantially cylindrical socket having a necked-in constriction which prevents further axial movement of the tubular bearing. Movement of the bearing into the cylindrical socket causes radially inward movement of the flared portion of the bearing which extends the area of contact between the bearing and the ball. A closure ring or plate is then applied against the free end of the plastic bearing and the end of the socket remote from the necked-in constriction is peened or spun over the closure member forcing the closure member axially against the end of the plastic bearing. In the construction of the present invention the closure member has a diameter somewhat less than the diameter of the cylindrical socket so that the closure may compress the plastic bearing an amount controlled by the amount of material that is peened or spun over against the closure member. Accordingly, during the assembly of the joint the apparatus employed for spinning, peening or swaging the closure member into position may be adjusted to move the closure plate either to a predetermined back pressure condition or, alternatively, to a predetermined axial position depending upon the equipment employed. In either case it has been found that the turning torque of the resulting joint employing the high density polyethylene plastic bearing is relatively independent of the load applied to the bearing plug or the axial deflection of the bearing plug, within a relatively wide range which is maintained without difficulty by modern production tools.

It is, accordingly, an object of the present invention to provide a readily manufactured highly efficient ball and socket joint with minimum tolerance criticality.

Another object of the invention is to provide an inexpensive ball joint having a minimum number of parts.

A feature of the invention resides in the construction of a plastic liner of high density polyethylene or the like.

Another feature of the invention resides in the provision of a ball and socket joint wherein the socket closure is unlimited in its movement.

Still another object of the present invention is to provide a readily controllable ball joint, which, by simple manufacturing variations, may be changed in its torque characteristic without modifying the machining of the basic joint parts.

Still other and further objects and features of the present invention will be at once apparent to those skilled in the art from a consideration of the attached drawings wherein two embodiments of the invention are shown by way of illustration only and wherein.

As shown on the drawings.

Figure 1:
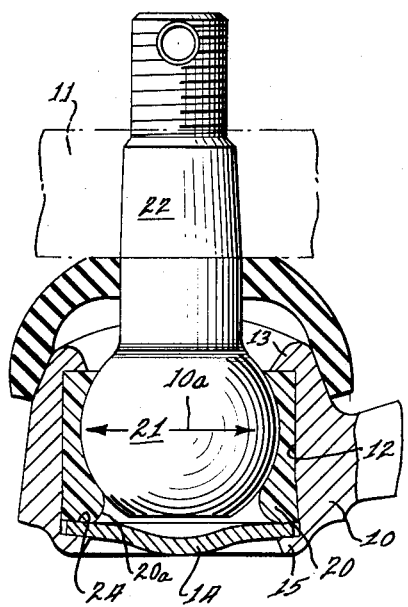
FIGURE 1 is a side-elevational view of a ball joint constructed and assembled in accordance with the principles of the present invention.
Figure 2:
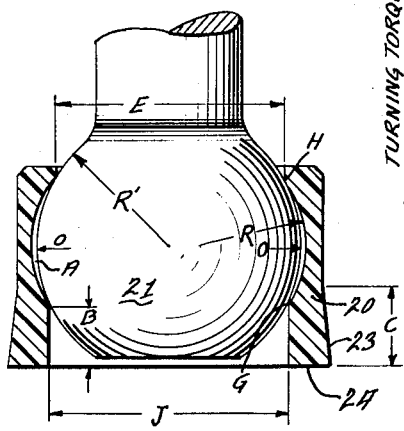
FIGURE 2 is a sub-assembly drawing of a ball stud and bearing sub-assembly combination illustrating the relative shapes of the ball and bearing ring.

As may be seen from a consideration of FIGURES 1 and 2, a first form of the invention comprises a ball joint having a first socket member 10 arranged for connection with a second link member 11.

In conventional automotive vehicles one important use for joints of the type illustrated in FIGURE 1 is the connection of a steering tierod or drag link with the pitman arm of the steering gear or an idler arm. In either event, the motion being transferred may comprise pivoting motion in a single plane or limited universal pivoting movement. In such steering joints it is imperative that very little slack appear in the system. At the same time, however, it is important that the joints turn relatively freely so as not to load the steering system of the vehicle with the unnecessary friction.

In accordance with the present invention the socket member 10 is provided with a generally cylindrical socket portion 12 having a necked-in restriction 13 and a closure plug or plate 14 maintained permanently in position by the lip 15 spun over, staked, or otherwise positioned to permanently prevent axial movement of the closure plate 14 in a direction opposite the necked-in portion 13. Positioned between the closure plate 14 and the necked-in portion 13 is a plastic bearing member 20 which closely surrounds ball head 21 integrally secured to the ball stud shank 22.

As will be observed from a consideration of FIGURE 2, the plastic member 20 is provided with an external surface which is substantially cylindrical throughout most of its length and is flared outwardly as shown at 23 at one end. The bushing or bearing 20 is annular in shape, without a longitudinal slot or cut and must, accordingly, be snapped over the ball 21 into the sub-assembly condition shown in FIGURE 2. This is readily accomplished in accordance with the present invention in view of the physical characteristics of the plastic material used. In accordance with the present invention the plastic comprises linear or high density polyethylene which is substantially more rigid, without brittleness, than the conventional low density polyethylene or intermediate density polyethylene materials previously known. It has been found that by providing an inwardly facing segmental toroidal concave socket form on the inside of the bearing 20 for co-operation with the stud head 21, a very snug fit, with a relatively large bearing area, is provided between the stud and the bearing.

It will be observed from FIGURE 2 that in the snapped-over condition, and prior to final assembly, the annular ring 20 may have a radius of curvature R slightly less than the ball radius R'. This provides circular line contact at G and H with an intermediate volume A. During assembly the grease applied to the parts is retained in the volume and although the grease tends to squeeze out of the volume A as the volume decreases with assembly pressures, it has been found that a thin film remains. When no such volume is provided the maximum contact pressure is at the ball diameter 0-0, tending to squeeze the grease outwardly from that point with no increased pressure area to inhibit its movement. In the arrangement illustrated it is preferred that diameter E be smaller than J and that length C be greater than B.

Upon assembly of the stud and bearing into the sub-assembly combination shown in FIGURE 2, the assembled unit 20 and 21 is press fitted into the socket cylinder 12 into the position shown in FIGURE 1 by forcing the stud and bearing subassembly axially through the socket 12. This movement will cause the flared portion 23 of the bearing to assume generally cylindrical configuration. During this change the plastic material of the bearing will necessarily move into close relation with the ball 21. Following insertion of the members 20 and 21 in the socket member 10 the closure plate 14 is positioned against the face 24 of the bearing and the lip 15 is forced thereover to provide a permanent assembly. As may be seen from FIGURE 1, the outside diameter of the closure plate 14 is somewhat less than the inside diameter of the socket 12 and, accordingly, the final position of the plate 14 is determined by the degree of deformation of lip 15. As will be observed in FIGURE 1, movement of the closure plate 14 upwardly will cause a bulging of the bearing materials at 20a causing an increasing bearing area to be in contact with the stud. The effect of variation in position of the plate 14 is more clearly illustrated by a consideration of the chart shown in FIGURE 3. As there shown, it will be observed that with a relatively wide range of closure plate or plug deflection, ranging for example from approximately .020 of an inch to .120 of an inch, a range of tolerances which is incredibly large, the turning torque increases from only approximately 20 to 35 inch pounds. These results were obtained experimentally utilizing high density, or linear, polyethylene material with a conventional initial greasing with ball joint grease such as, for example, Texaco No. 5 Grease. Thus, in spite of a very wide range of deflection or axial movement of the closure plate 14 with a resultant wide range of load axially applied to the end of the bearing 20, a relatively narrow range of turning torque is provided and, accordingly, very accurate control of the turning torque is possible with essentially non-critical tolerances as far as joint assembly is concerned. This is without precedence in the construction of ball joints for automotive use. In prior devices employing conventional low density polyethylene or similar materials, the joint was far more critical to the amount of pressure applied during the assembly and conventional practice dictated utilization of a shoulder in the socket 12 upon which the closure plate 14 was seated. The positioning of the shoulder ordinarily dictated the amount of loading available and required a manufacturing tolerance more critical than the present joint. The present case, by providing a combination of a proper material, namely high density or linear polyethylene, with a non-shoulder closure plate construction a combination joint is provided which has very satisfactory turning torque characteristics over a wide range permitting manufacture of the joints with an absolute minimum of rejects or scrap.

Figure 4:
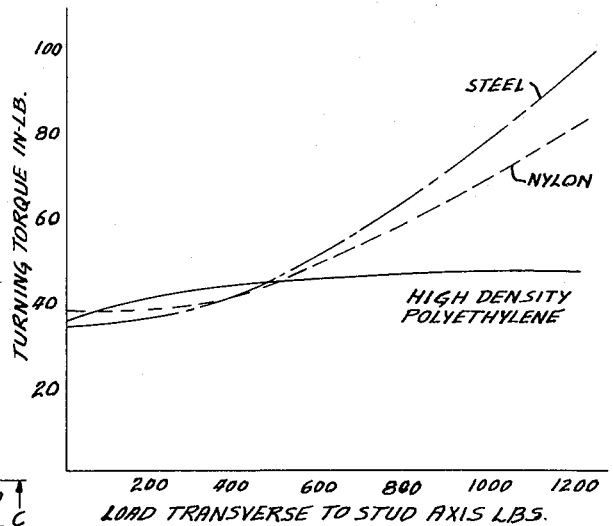
FIGURE 4 is a chart illustrating the relationship between ball joint load and turning torque for several materials.

Further, it has been found, through experiment that under ball joint loads applied transversely of the axis of the ball stud, for example in the direction 10a shown in FIGURE 1, the joint of the present invention provides a substantially constant turning torque. This is a highly important result not achieved with prior joint materials, as may be observed from the chart, FIGURE 4. As there shown, conventional joint materials nylon and steel both show a rapid rise in turning torque with increasing lateral load on the ball joint. On the other hand, in the ball joint employing high density polyethylene the turning torque is substantially constant independently of load.

Figure 3:
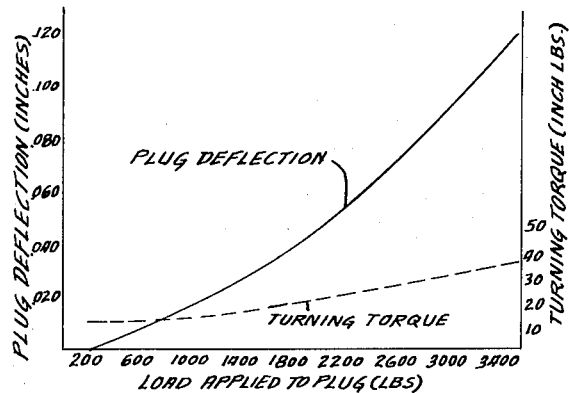
FIGURE 3 is a chart illustrating the relationship between the various physical characteristics of the joint components and their relation to output turning torque of the assembled joint.
Figure 5:
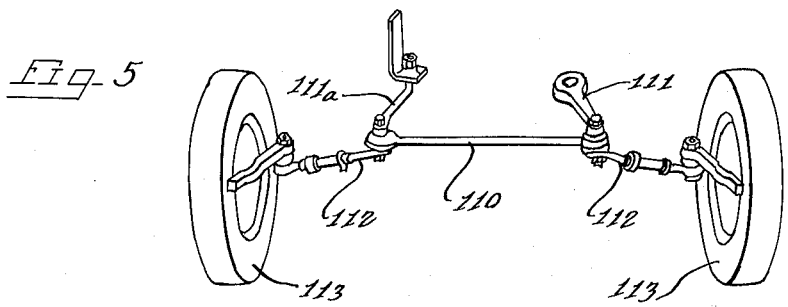
FIGURE 5 is a diagrammatic illustration of a vehicle assembly employing a modified form of the joint of the present invention.
Figure 6:
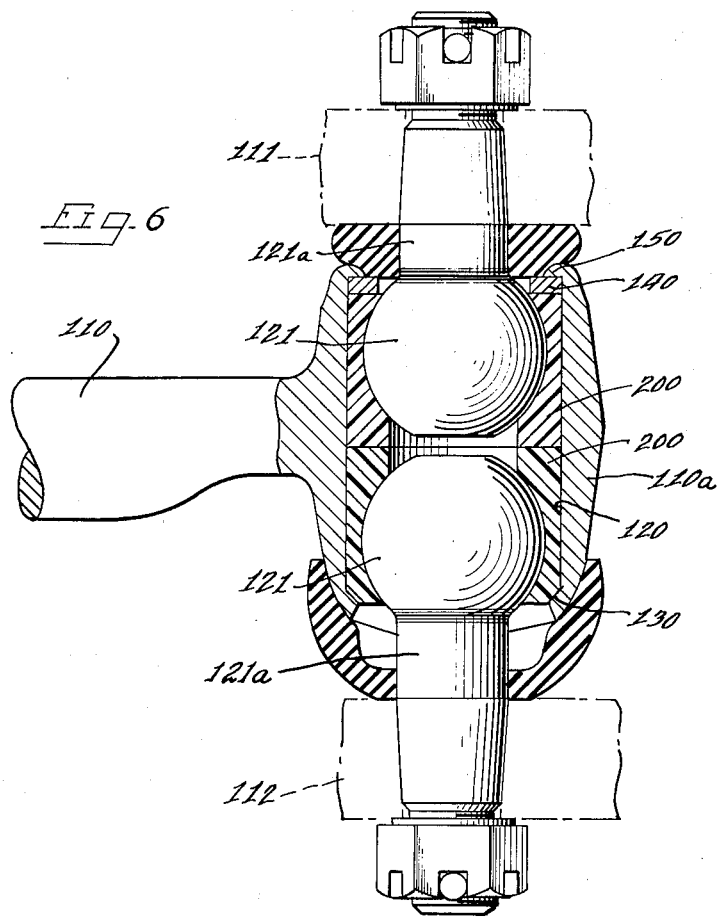
FIGURE 6 is a side-elevational view of the modified joint shown in FIGURE 5.

The characteristics of the invention described above relative to the single ball and socket joint shown in FIGURES 1, 2 and 3 may similarly be realized in a dual joint construction such as shown in FIGURE 6. There a modified dual socket member 110a is provided with a cylindrical socket 120 which accepts a pair of ball studs 121 whose shanks 121a are secured to respective link members 111 and 112. In the arrangement illustrated the member 110 comprises a transversely moving center link, the link member 111 comprises a pitman arm or an idler arm, the latter indicated at 111a of FIGURE 5, and the links 112 comprise tierod links connecting the center link 110 with the steering arm of the individual vehicle wheels 113.

As may be seen in FIGURE 6, the generally cylindrical socket 120 is provided with a necked-in constriction 130 against which a pair of linear or high density polyethylene members 200 are positioned after initial sub-assembly onto the ball studs 121. Closure plate 140 is positioned around the shank 121a of the upper ball stud 121 and is forced downwardly to deform the members 200 into tight engagement with the ball studs 121 in the manner discussed above in connection with FIGURE 1. In this process the socket member 110 is spun or peened over as at 150. In connection with the embodiment shown at FIGURE 6 it will be observed that the individual members 200 may be assembled in the relation shown or reversed axially end to end, individually, the compressive deformation axially of the members 200 being caused by their stacked condition under compressive load by the spinning operation at 150.

It will be observed, in accordance with the construction hereinabove set forth, that I have provided a novel and substantially improved ball joint construction capable of inexpensive manufacture to relatively accurate pre-load condition.

As pointed out above, this result is provided by the physical construction of the joint in combination with the utilization of linear or high density polyethylene, a substance greatly different from the conventional low density polyethylene of the type satisfactory for utilization in the present invention may have a density between approximately .94 and .96, a stiffness modulus in the range of 50,000 to 140,000 pounds per square inch, a tensile strength on the order of 2,800 to 6,400 pounds. It has been recognized in the plastics industry that such high density polyethylene is completely different from that heretofore known and it has been found, as above shown, that utilization of this material in the specific configuration illustrated provides a materially improved—yet less expensive in construction—joint.

It will be, of course, apparent to those skilled in the art that variations may be made in accordance with the teachings of the present invention without departing from the novel concepts thereof, and it is, accordingly, my intention that the invention be limited solely by the scope of the hereinafter appended claims.

I claim as my invention:

1. In combination in a ball joint housing having a generally annular socket with a reduced diameter neck portion at one end thereof,
    a stud projecting into said socket through said neck portion and having a segmental spherical head thereon positioned in said socket,
    an annular plastic seat member supporting the stud head within the socket having a generally segmental toroidal concave inner surface surrounding and directly contacting and supporting the head and a flared outer surface flaring radially outwardly in the direction away from the neck portion having an interference fit with the socket when on said head,
    a closure plate for said socket spaced from said head and having a circumference in loose interference-free relation to the interior surface of said socket, and
    means securing said plate against said plastic seat member and compressing said seat against said neck and deforming it into tight fit against said head, said plastic seat member comprising high density polyethylene and said segmental toroidal concave inner surface having a radius of curvature adjacent the transverse diameter of the head which is slightly smaller than the radius of the head and projected from a point spaced from the center of said spherical head whereby the head contacts the internal surface of said bearing along spaced annular lines, the space provided between the outside of the head and the inside surface of the plastic bearing member between said spaced annular lines having grease confined therein.

2. In combination in a ball joint housing having a generally annular socket with a reduced diameter neck portion at one end thereof,
    a stud projecting into said socket through said neck portion and having a segmental spherical head thereon positioned in said socket,
    an annular plastic seat member supporting the stud head within the socket having a generally segmental toroidal concave inner surface surrounding and directly contacting and supporting the head and an outer surface flaring radially outwardly in the direction away from the neck portion having an interference fit with the socket when on said head,
    a closure plate for said socket spaced from said head and having a circumference in loose interference-free relation to the interior surface of said socket, and
    means securing said plate against said plastic seat member and compressing said seat against said neck and deforming it into tight fit against said head, said segmental toroidal concave inner surface having a radius of curvature adjacent the transverse diameter of the head which is slightly smaller than the radius of the head and projected from a point spaced from the center of said spherical head whereby the head contacts the internal surface of said bearing along spaced annular lines, the space provided between the outside of said head and the inside surface of the plastic bearing member between said spaced annular lines having grease confined therein.

3. In combination in a ball joint housing having a generally cylindrical socket with a reduced diameter neck portion,
    a stud projecting into said socket through said portion and having a segmental spherical head thereon positioned in said socket,
    an annular plastic seat member having a generally segmental toroidal concave inner surface surrounding and directly contacting and supporting the head and an outer surface flared radially outwardly in the direction away from the neck portion having an interference fit with the socket when on said head,
    a closure plate for said socket spaced from said head and having a circumference in loose interference-free relation to the interior surface of said socket, and
    means securing said plate against said plastic seat member to compress said seat member against said neck and acting to deform it into tight fit against said head, said inner surface having a radius of curvature adjacent the transverse diameter of the head which is slightly smaller than the radius of the head and projected from a point spaced from the center of said spherical head whereby the head contacts the internal surface of said bearing along spaced annular lines, the space provided between the outside of said head and the inside surface of the plastic bearing member between said spaced annular lines having grease confined therein.

References Cited by the Examiner

UNITED STATES PATENTS

| | | |
|---|---|---|
| 1,989,116 | 1/1935 | Strauss. |
| 2,049,502 | 8/1936 | Huffered et al. |
| 2,942,901 | 1/1960 | Booth. |
| 3,063,744 | 11/1962 | Flumerfelt _____ 287—87 |
| 3,079,183 | 2/1963 | Melton et al. |
| 3,079,184 | 2/1963 | Melton et al. |
| 3,128,110 | 4/1964 | Herbenar. |

FOREIGN PATENTS

| | | |
|---|---|---|
| 232,208 | 1/1961 | Australia. |

CARL W. TOMLIN, *Primary Examiner.*

A. V. KUNDRAT, *Assistant Examiner.*